United States Patent
Lee et al.

(10) Patent No.: US 10,474,801 B2
(45) Date of Patent: *Nov. 12, 2019

(54) METHOD OF ENABLING AND DISABLING OPERATING AUTHORITY OF HANDHELD DEVICE

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 155 days.

This patent is subject to a terminal disclaimer.

(21) Appl. No.: 15/485,212

(22) Filed: Apr. 11, 2017

(65) Prior Publication Data

US 2017/0293750 A1 Oct. 12, 2017

(30) Foreign Application Priority Data

Apr. 12, 2016 (TW) .............................. 105111336 A (51) Int. Cl.
*G06F 21/00* (2013.01)
*G06F 21/32* (2013.01)
(Continued)

(52) U.S. Cl.
CPC .......... *G06F 21/32* (2013.01); *G06F 21/6218* (2013.01); *G06K 9/00013* (2013.01); *G06K 9/00087* (2013.01)

(58) Field of Classification Search
CPC ...... G06F 21/32; G06F 21/6218; G06F 3/041; G06F 21/84; G06K 9/00013; G06K 9/00087

(Continued)

(56) References Cited

U.S. PATENT DOCUMENTS 8,346,217 B2 * 1/2013 Crawford .............. H04W 12/06
455/410
8,401,522 B2 * 3/2013 Crawford ................ G06F 21/31
455/410

(Continued)

FOREIGN PATENT DOCUMENTS

CN 102752437 A 10/2012
CN 104992091 A 10/2015

(Continued)

OTHER PUBLICATIONS

Christina Bonnington, Track Down Your Missing iPhone With 'Lost Mode', Apr. 22, 2014, www.wired.com, p. 1 (Year: 2014).*

(Continued)

*Primary Examiner* — Jeremiah L Avery
(74) *Attorney, Agent, or Firm* — Chun-Ming Shih; HDLS IPR Services (57) ABSTRACT

A method of enabling and disabling operating authority of handheld device is provided. The method includes following steps of: detecting whether a user is holding a handheld device; control the handheld device to enable an operating authority when detecting that the user is holding the handheld device; detecting whether the user stops holding the handheld device; control the handheld device to disable the operating authority when detecting that the user stops holding the handheld device. It may effectively manage the operating authority and simplify the operation of enabling and disabling the operating authority via enabling and disabling the operating authority automatically according to the user-holding status of the handheld device.

13 Claims, 8 Drawing Sheets

(51) Int. Cl.
*G06F 21/62* (2013.01)
*G06K 9/00* (2006.01)

(58) Field of Classification Search
USPC .............................................. 726/18, 26–28
See application file for complete search history.

(56) References Cited

U.S. PATENT DOCUMENTS

| | | | | |
|---|---|---|---|---|
| 9,507,918 | B2* | 11/2016 | Berger | G06K 17/00 |
| 2005/0226468 | A1* | 10/2005 | Deshpande et al. | 382/115 |
| 2010/0134424 | A1* | 6/2010 | Brisebois | G06F 3/03547 |
| | | | | 345/173 |
| 2011/0072520 | A1* | 3/2011 | Bhansali | G06F 21/572 |
| | | | | 726/27 |
| 2012/0032945 | A1* | 2/2012 | Dare | G06F 3/0481 |
| | | | | 345/418 |
| 2014/0317722 | A1* | 10/2014 | Tartz et al. | G06F 21/32 |
| | | | | 726/19 |
| 2014/0375582 | A1* | 12/2014 | Park et al. | G06F 3/0414 |
| | | | | 345/173 |
| 2015/0205358 | A1* | 7/2015 | Lyren | G06F 3/0484 |
| | | | | 715/765 |
| 2015/0242605 | A1* | 8/2015 | Du | G06F 21/32 |
| | | | | 726/7 |
| 2015/0277652 | A1 | 10/2015 | Kim | |
| 2015/0319294 | A1* | 11/2015 | Sudhir | H04M 1/72541 |
| | | | | 455/411 |
| 2015/0324564 | A1* | 11/2015 | Sahu | G06F 21/45 |
| | | | | 726/19 |
| 2016/0014260 | A1* | 1/2016 | Cudak | H04M 1/67 |
| | | | | 455/411 |
| 2016/0014261 | A1* | 1/2016 | Cudak | H04M 1/67 |
| | | | | 455/411 |
| 2016/0076952 | A1* | 3/2016 | Kim | H03K 17/962 |
| | | | | 345/173 |
| 2016/0275281 | A1* | 9/2016 | Ranjit | G06F 21/32 |
| 2016/0364624 | A1* | 12/2016 | Kim et al. | G06K 9/4647 |
| 2017/0017783 | A1* | 1/2017 | Willis | G06F 21/32 |
| 2017/0024597 | A1* | 1/2017 | Cho | G06F 21/32 |
| 2017/0115782 | A1* | 4/2017 | Hinckley | G06F 3/0346 |
| 2017/0295180 | A1* | 10/2017 | Day | G07C 9/00309 |

FOREIGN PATENT DOCUMENTS

| | | |
|---|---|---|
| TW | 201502838 A | 1/2015 |
| WO | 2010051041 A1 | 5/2010 |
| WO | 2015162189 A1 | 10/2015 |

OTHER PUBLICATIONS

Shin, YongNyuo et al. Designing fingerprint-recognition-based access control for electronic medical records systems. 22nd International Conference on Advanced Information Networking and Applications Workshops. https://ieeexplore.ieee.org/stamp/stamp.jsp?tp=&arnumber=4482898 (Year: 2008).*

Feng, Tao et al. Continuous Remote Mobile Identity Management Using Biometric Integrated Touch-Display. 2012 45th Annual IEEE/ACM International Symposium on Microarchitecture Workshops. https://ieeexplore.ieee.org/stamp/stamp.jsp?tp=&arnumber=6472492 (Year: 2012).*

Office Action dated Jun. 16, 2017 of the corresponding Taiwan patent application.

* cited by examiner

METHOD OF ENABLING AND DISABLING OPERATING AUTHORITY OF HANDHELD DEVICE

BACKGROUND OF THE INVENTION

Field of the Invention

The technical field relates to method of enabling and disabling and more particularly related to method of enabling and disabling operating authority of handheld device.

Description of Related Art

In the operation of current handheld device, user needs to manually perform a plurality of operations to handheld device and then make operating authority be enabled when user intends to enable the specific operating authority of the handheld device. For example the user needs to manually operate the handheld device to display an electronic menu of switching operating authority, select the operating authority which the user intends to enable, and confirm to enable the selected operating authority.

Moreover, the user also needs to manually perform a plurality of operations to handheld device and then make operating authority be disabled when user intends to disable above-mentioned operating authority of the handheld device. For example the user needs to manually operate the handheld device to display the electronic menu of switching operating authority, select the current enabled operating authority, and confirm to disable the selected operating authority.

As can be seen from above description, in the operation of current handheld device, the user needs to perform various operations when the user intends to enable or disable the specific operating authority of the handheld device. It is not convenient for user and user cannot get good user experience.

SUMMARY OF THE INVENTION

It is an object of the present invention to provide a method of enabling and disabling operating authority of handheld device to automatically enable and disable operating authority according to the status of the user holding the handheld device.

Accordingly, the present invention provides a method of enabling and disabling operating authority of handheld device, comprising: a) detecting a holding action of a user via at least one fingerprint sensor of a handheld device; b) generating a holding data when detecting the holding action of the user, wherein the holding data comprises a fingerprint composite data, the fingerprint composite data corresponds to fingerprint of the user's fingers pressing on the at least one fingerprint sensor or palm print of the user's palm pressing on the at least one fingerprint sensor; c) performing a fingerprint verification for the fingerprint composite data of the holding data, and controlling the handheld device to enable an operating authority when the holding data passes the fingerprint verification; d) continually or intermittently detecting the holding action of the user via the at least one fingerprint sensor; and, e) controlling the handheld device to disable the operating authority when the holding action is not detected.

Accordingly, the present invention provides a method of enabling and disabling operating authority of handheld device, comprising: a) detecting a holding action of a user via at least one touch sensor of a handheld device; b) generating a holding data when detecting the holding action of the user, wherein the holding data comprises a touch composite data, the touch composite data corresponds to a touch status of the user's fingers or palm pressing on the at least one touch sensor; c) performing a touch verification for the touch composite data of the holding data, and controlling the handheld device to enable an operating authority when the holding data passes the touch verification; d) continually or intermittently detecting whether the user stops holding the handheld device via the at least one fingerprint sensor; and, e) controlling the handheld device to disable the operating authority when the holding action is not detected.

The present invention can effectively manage the operating authority and simplify the operation of enabling and disabling the operating authority via enabling and disabling the operating authority automatically according to the user-holding status of the handheld device.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
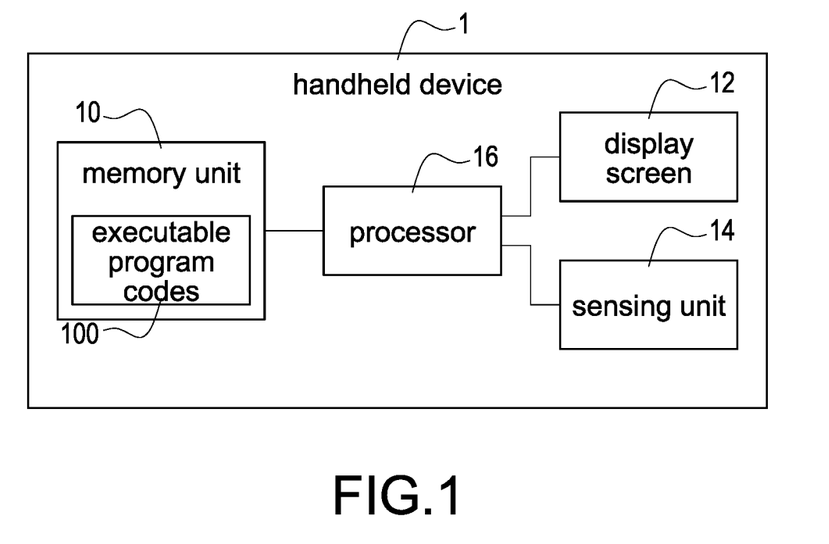
FIG. 1 shows a schematic diagram of a handheld device according to a first embodiment of the present invention.

First, please refer to FIG. 1, which shows a schematic diagram of a handheld device according to a first embodiment of the present invention. The present invention discloses a method of enabling and disabling operating authority for handheld device 1 and applicable to the handheld device 1 shown in FIG. 1. The handheld device 1 (such as smart phone, tablet computer, wearable device, or digital camera) according to the present invention mainly comprises a memory unit 10 for storing data or program codes, a display screen 12 (such as a touch display), at least one sensing unit 14 and a processor 16 electrically connected to above-mentioned units. The memory unit 10 is used to store data while the processor 16 is used to provide control function for the handheld device 1.

Figure 7:
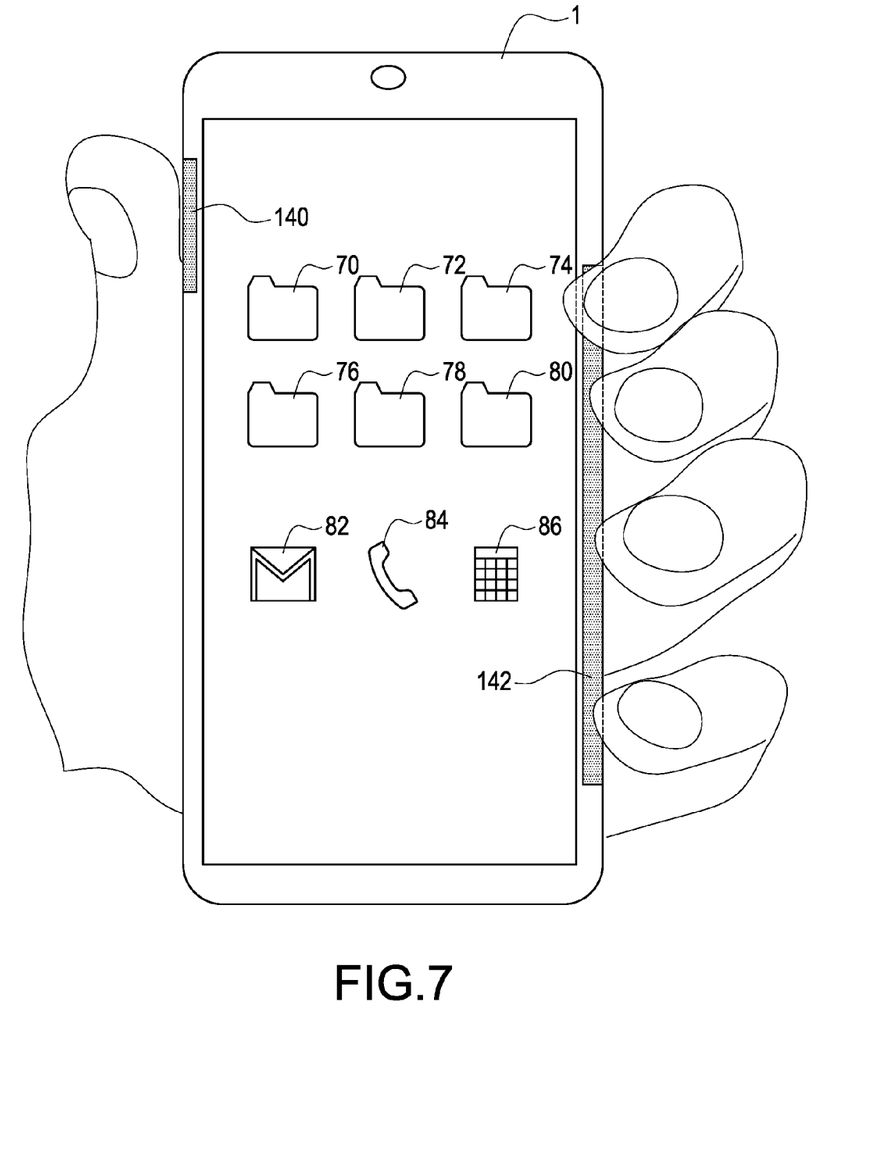
FIG. 7 is a schematic view of enabling a first operating authority according to the present invention.
Figure 8:
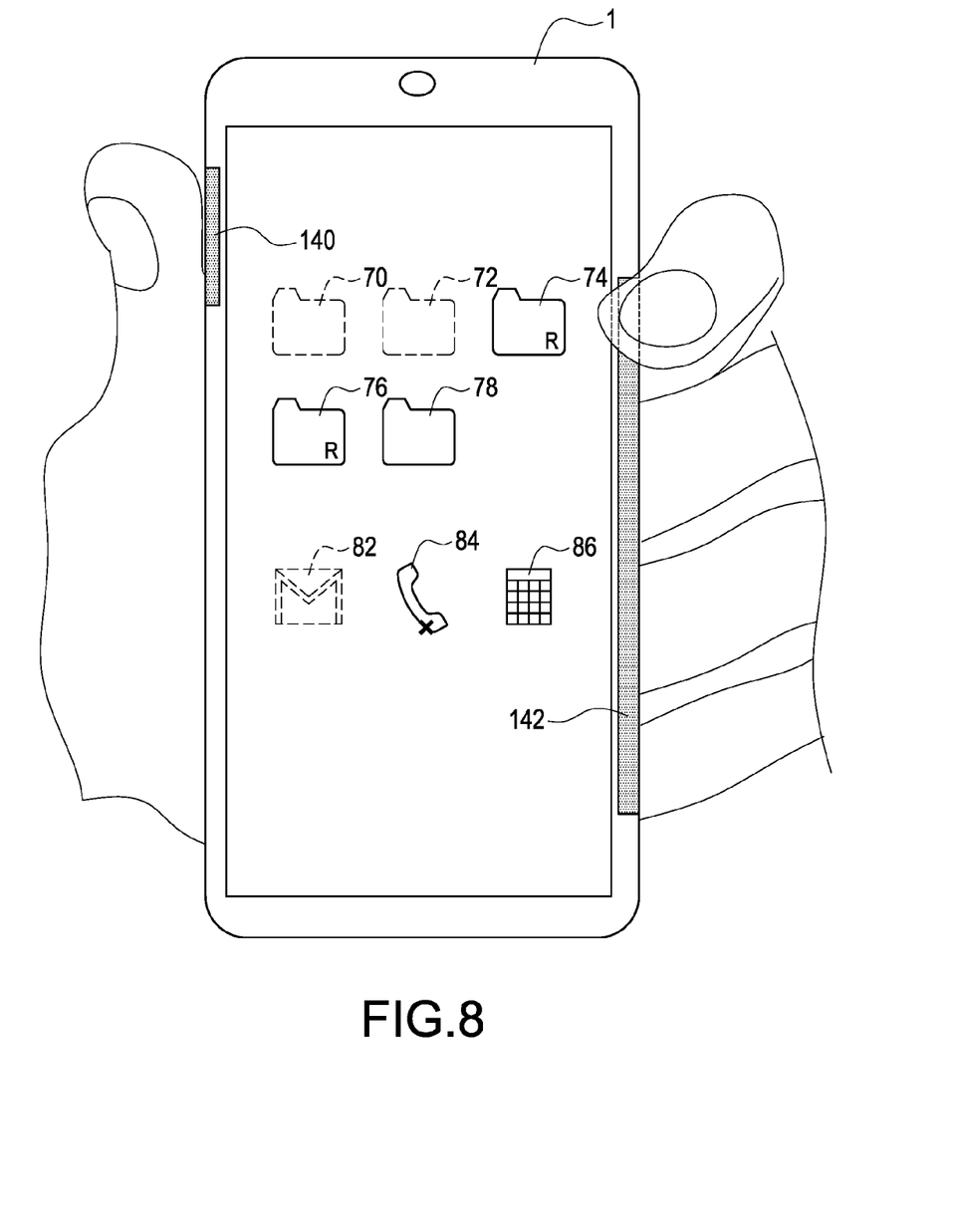
FIG. 8 is a schematic view of enabling a second operating authority according to the present invention.

The sensing unit 14 is arranged on a grip portion of the handheld device 1, which is naturally held by user in the operation of the handheld device 1 and is, for example, the positions corresponding to the location of the fingerprint sensors 140-142 shown in FIGS. 7 and 8. Preferably, the sensing unit 14 is, for example but not limited to, a fingerprint sensor or a touch sensor (such as a force sensor or touchpad).

The sensing unit 14 is inevitably touched by the user when the user holds the handheld device 1 and the sensing unit 14 will generate a triggering signal correspondingly. The present invention determines whether the user currently holds the handheld device 1 according to the triggering of the sensing unit 14 and enables or disables operating authority (detailed later) according to the determination result of user holding the handheld device 1 or not.

In the above embodiment, the sensing unit 14 is exemplified to be arranged directly on (built-in) the handheld device 1, but this is not limitation to the present invention.

In another embodiment, the sensing unit 14 is arranged on a detachable back shell (not shown) of the handheld device 1. The sensing unit 14 is further electrically connected to the processor 16 when the back shell is assembled to the handheld device 1. Preferably the back shell has a connector corresponding to the connection port of the handheld device 1. The connector of the back shell is detachably connected to a connection port of the handheld device 1 when the back shell is assembled to the handheld device 1 such that the sensing unit 14 is electrically connected to the processor 16. In still another embodiment, the sensing unit 14 may be wirelessly connected to the processor 16 to dispense with the connection port of the handheld device 1.

Figure 2:
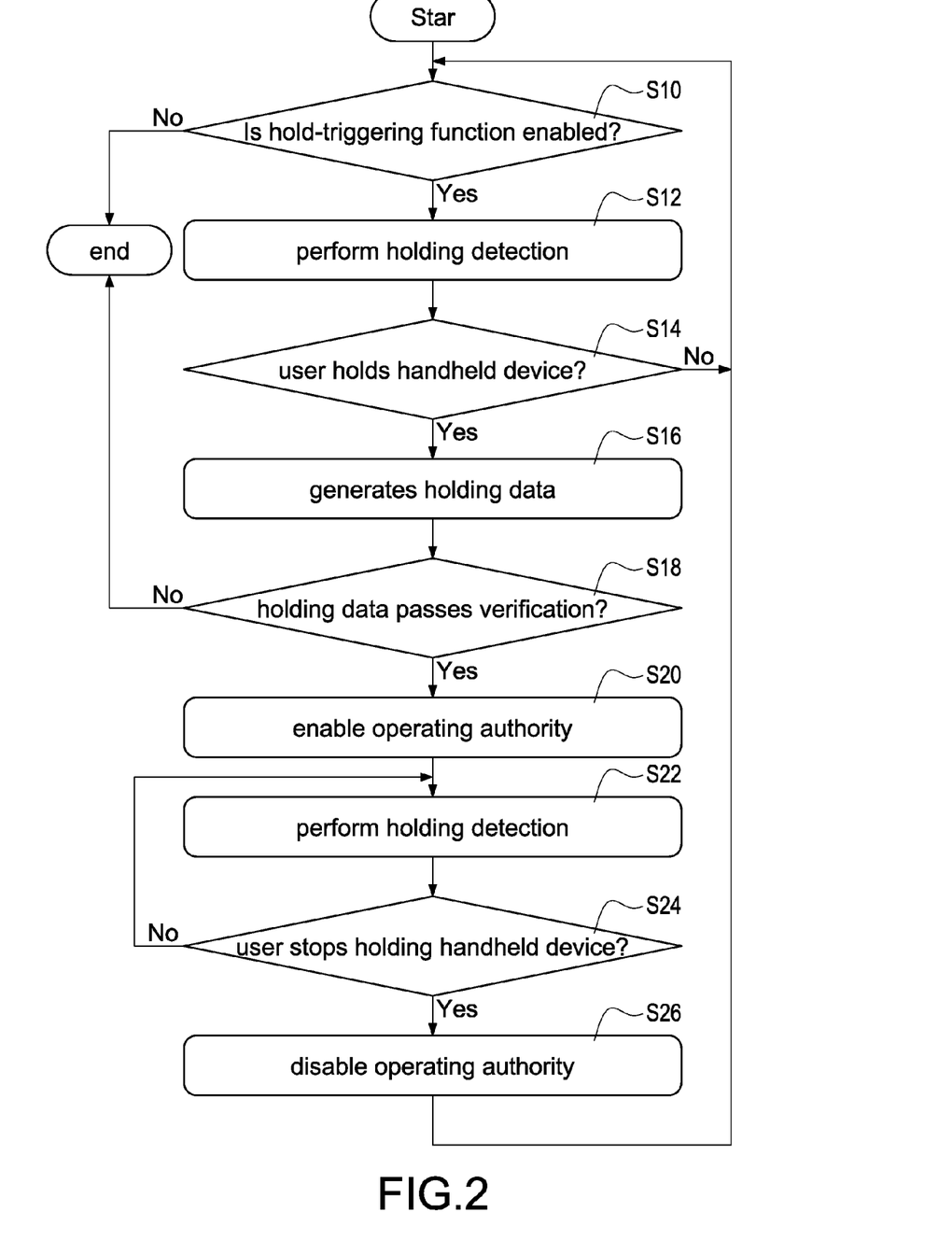
FIG. 2 shows a flowchart of a method of enabling and disabling operating authority for the handheld device according to a first embodiment of the present invention.

FIG. 2 shows a flowchart of a method of enabling and disabling operating authority for the handheld device according to a first embodiment of the present invention. The methods according to various embodiments of the present invention may be performed on the handheld device 1 shown in FIG. 1. More specifically, the memory unit 10 further stores executable program codes 100. The processor 16 executes the executable program codes 100 to realize the method of enabling and disabling operating authority for the handheld device 1 according to various embodiments of the present invention. The method of enabling and disabling operating authority for the handheld device 1 according to the first embodiment of the present invention has following steps to realize hold-triggering function.

Step S10: the processor 16 determines whether the hold-triggering function is enabled? More specifically, the user may enable or disable the hold-triggering function via operating touchscreen or physical key(s) of the handheld device 1.

Therefore, the user has more satisfactory user experience by flexibly enabling/disabling hold-triggering function according the user's need. For example, the user may disable the hold-triggering function of the present invention when the handheld device 1 is placed on a table during operation thereof, namely not during holding operation. In this way, the handheld device 1 can be prevented from automatically disabling operating authority, such that the user is unable to operate the handheld device 1.

The step S12 is executed if the processor 16 confirms the enabling of the hold-triggering function, or the method of enabling and disabling operating authority for the handheld device 1 is ended.

Step S12: the processor 16 detects the user holding the handheld device 1 or not.

More specifically, the processor detects continually or intermittently (such as detect the holding for every 5 seconds) whether the sensing unit 14 sends the triggering signal thereto when the handheld device 1 is in an operating-authority-disabling status.

Preferably, the handheld device 1 determines the user has no operating authority in above-mentioned operating-authority-disabling status, and refuses to receive all operations or the specific operation of the user, such as modifying the specific file or opening the specific application program. Besides, the handheld device 1 in the operating-authority-disabling status may prevent from the confidential file being modified or the application program being opened or re-configured because of the user having not ability of operating the handheld device 1 at will.

Preferably, the sensor unit 14 may be a fingerprint sensor or a touch sensor, and may be arranged outside a display region of the display screen 12 of the handheld device 1. Take the sensor unit 14 being fingerprint sensor for example, when user holds the handheld device 1 and the user's fingers (or palm) press the sensing unit 14, the sensing unit 14 is triggered to generate corresponding triggering signal (which is corresponding to the fingerprint of the finger or palm-print of the palm pressing the sensing unit 14), and the sensing unit 14 sends the triggering signal to the processor 16.

Take the sensor unit 14 being touch sensor (such as force sensor or touchpad) for example, when the user holds the handheld device 1 and the user's fingers (or palm) press the sensing unit 14, the sensing unit 14 is triggered to sense the number, the positions and the forces of touching points (by finger or palm). The sensing unit 14 then generates corresponding triggering signal (which is corresponding to the number, the positions, the forces or the order of touching points exerted by finger or palm and sensed by the sensing unit 14) and the sensing unit 14 sends the triggering signal to the processor 16.

Step S14: the processor 16 determines whether the user currently holds the handheld device 1 according to the triggering signal sent from the sensing unit 14.

It should be noted that the sensing unit 14 is arranged on grip portion of the handheld device 1, which is usually and naturally held by user. The sensing unit 14 is inevitably touched by the user when the user holds the handheld device 1. The sensing unit 14 will generate a triggering signal correspondingly and sends the triggering signal to the processor 16.

The processor 16 determines that the user currently holds the handheld device 1 (namely the user intends to operate the handheld device 1 currently) and executes step S16 when the processor 16 receives the triggering signal sent from the sensing unit 14. Otherwise, the processor 16 determines that the user currently does not hold the handheld device 1 (namely the user does not intend to operate the handheld device 1 currently) and re-executes the step S10 to maintain the operating-authority-disabling status of the handheld device 1.

Preferably, the handheld device 1 comprises a plurality of sensing units 14 and the processor 16 determines that the user currently holds the handheld device 1 only if the processor 16 receives triggering signals from the sensing units 14 with a predetermined number (such as the whole of or more than half of the sensing units 14).

Step S16: the processor 16 generates a holding data corresponding to a current holding action of the user according to the received triggering signal.

For example, when the sensing unit 14 is fingerprint sensor, the holding data may comprise the data of fingerprint of the user's fingers pressing on the fingerprint sensor or palm print of the user's palm pressing on the fingerprint sensor. When the sensing unit 14 is touch sensor, the holding data may comprises the data of the number, the positions, the forces or the order of touching points exerted by finger or palm pressing on the touch sensor Step S18: the processor 16 determines whether the holding data passes verification. Preferably, the processor 16 determines whether the holding data is matched with a preset holding data, such as preset fingerprint data, the data of the number, the positions, the forces or the order of touching points.

If the processor 16 determines the holding data passes the verification, the processor 16 executes step S20. Otherwise, the method of enabling and disabling operating authority for the handheld device 1 is ended.

Step S20: the processor 16 controls the handheld device 1 to enable the operating authority, so as to make the handheld device 1 switch to an operating-authority-enabling status.

Please be noted that the handheld device 1 may be permissible to receive the specific operation of the user according to the content of the operating authority when the handheld device 1 is in the operating-authority-enabling status.

Preferably, above-mentioned operating authority is an authority of allowing searching, opening, editing, converting or accessing the specific file stored in the handheld device 1, or an authority of allowing executing, re-configuring, uninstalling or installing the specific application program codes in the handheld device 1.

For example, if the operating authority is that only allowing opening all the files stored in the handheld device 1 (such as read only operating authority), the handheld device 1 may automatically be controlled to enable the operating authority when the user's holding action is detected by the sensing unit 14 and the corresponded holding data passes the verification. In this status, the user may operate the handheld device 1 to open any file freely, but have not ability of editing any file.

In another example, if the operating authority is that only allowing executing the calculator application program, the handheld device 1 may automatically be controlled to enable the operating authority when the user's holding action is detected by the sensing unit 14 and the corresponded holding data passes the verification. In this status, the user may operate the handheld device 1 to use the calculator application program, but have not ability of use the other application programs.

Thus, an administrator or the owner of the handheld device 1 may configure the different operating authorities for the different users in advance, so as to make the handheld device 1 have ability of enabling the different operating authority when being held by the different user. Thus, The present invention can effectively limit an operating behavior of the user to prevent the user from operating over the user's authority. Besides, the user can make the handheld device 1 enable the corresponded operating authority directly without another operation after the user holds the handheld device 1.

Step S22: the processor 16 detects user holding the handheld device 1 or not. More particularly, the processors 16 detects, in operating-authority-enabling status, continually or intermittently (for example, detects the holding for every 5 seconds) whether the processors 16 ceases to receive the triggering signal from the sensing unit 14.

Preferably, the sensing unit 14 will still generate the triggering signal and send the triggering signal to the processor 16 when the user keeps holding the handheld device 1 such that the user's finger or palm keeps touching the handheld device 1. The sensing unit 14 stops from generating the triggering signal and from sending the triggering signal to the processor 16 when the user stop holding the handheld device 1 such that the user's finger or palm does not touch the handheld device 1 (for example, the user puts down the handheld device 1).

Step S24: the processor 16 determines whether the holding action is not detected (namely, the user stops holding the handheld device 1) according to the sensing unit 14 sending the triggering signal thereto or not.

Preferably, the processor 16 determines that the holding action is not detected if the processor 16 does not receive the triggering signal from the sensing unit 14 (for example, does not receive the triggering signal from the sensing unit 14 for duration of 5 seconds). The processor 16 determines that the holding action is detected if the processor 16 still receives the triggering signal from the sensing unit 14 continually or intermittently.

Preferably, in this step, the processor 16 only detects whether the processor 16 stops receiving the triggering signal from the sensing unit 14, and doesn't perform the verification to the user currently holding the handheld device 1. Namely, the processor 16 doesn't generate the holding data again, or the processor 16 generates the holding data again and doesn't perform the verification to the new generated holding data.

On the other hand, after the operating authority complete to be enabled, the operating authority will not be disabled as long as the user holds the handheld device 1 continually, even the user changes the posture of holding the handheld device 1 (for example, the fingers pressed the sensing unit 14 is changed). Thus, the user may hold the handheld device 1 by the most comfortable holding posture after the operating authority had been enabled.

The processor 16 executes step S26 if the processor 16 determines that the user stops holding the handheld device 1. Otherwise, the processor 16 executes the step S22 again.

Step S26: the processor 16 disables the operating authority to make the handheld device 1 switch to the operating-authority-disabling status.

More specifically, the handheld device 1 will refuse the user's operation because of the user having no any operating authority when the handheld device 1 is in operating-authority-disabling status.

Thus, the handheld device 1 can disable the current operating authority directly without another operation after the user picks up the handheld device 1, so as to effectively limit the unauthorized user (such as a thief or a picker finding the handheld device 1) to operate the handheld device 1.

The present invention may select the corresponded operating authority via identifying the use holding the handheld device, and may enable and disable the operating authority automatically according to the user-holding status of the handheld device. The present invention may effectively manage the operating authority and simplify the operation of enabling and disabling the operating authority.

Figure 3:
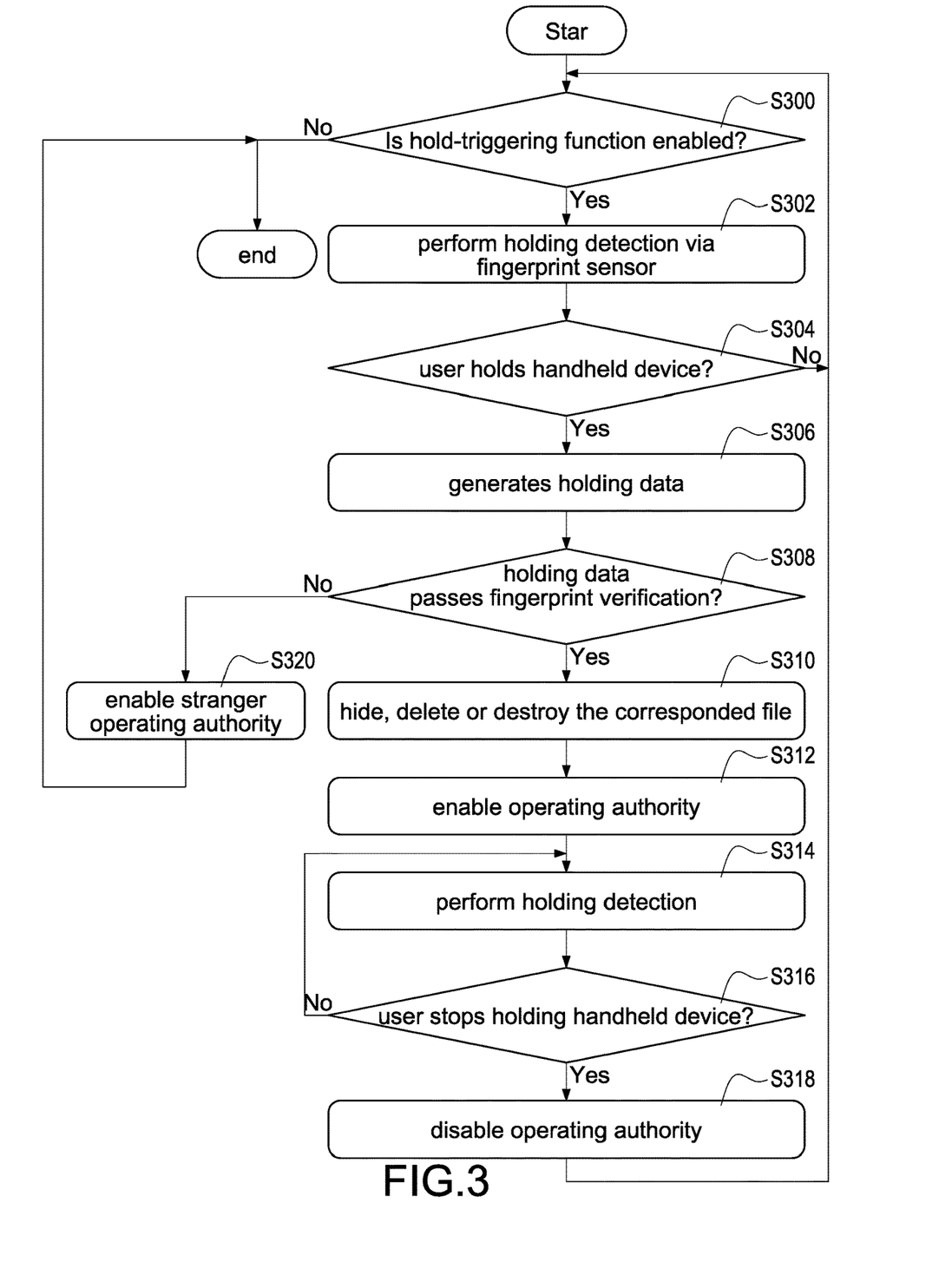
FIG. 3 shows a flowchart of a method of enabling and disabling operating authority for the handheld device according to a second embodiment of the present invention.

Please refer to FIG. 3, which shows a flowchart of a method of enabling and disabling operating authority for the handheld device according to a second embodiment of the present invention. In this embodiment, the handheld device 1 may comprise one or more sensing unit 14. Any sensing unit 14 may be a fingerprint sensor.

Preferably, a sensing region of at least one fingerprint sensor has an area larger than 2.25 square centimeters and a side length larger than 1.5 centimeters, but this specific example is not intended to limit the scope of the present invention.

The method of enabling and disabling operating authority for the handheld device according to the present invention has following steps to realize hold-triggering function by fingerprint identification.

Step S300: the processor 16 determines whether the hold-triggering function is enabled. The processor 16 executes step S302 if the hold-triggering function is enabled; otherwise the operating method for the handheld device 1 is ended.

Step: S302: the processor 16 determines whether the user currently holds the handheld device 1 according to the sensing of the fingerprint sensor. More particularly, the fingerprint sensor generates triggering signal and sends the triggering signal to the processor 16 when the fingerprint sensor senses the touch of the user's finger (or palm) on the sensing region thereof.

Step: S304: the processor 16 determines whether the user currently holds the handheld device 1. More particularly, the processor 16 determines that the user currently holds the handheld device 1 and then executes the step S306 when the processor 16 receives the triggering signal from the fingerprint sensor. The processor 16 determines that the user currently does not hold the handheld device 1 and then re-executes the step S300 when the processor 16 does not receive the triggering signal from the fingerprint sensor.

Step: S306: the processor 16 generates a holding data corresponding to the user's holding action according to the triggering signal received from each fingerprint sensor. Preferably, the holding data comprises a fingerprint composite data and the fingerprint composite data is corresponded to a touch status (such as the number, the positions and the order of the touching points) of the fingerprint of the user's finger (or palm print of the user's palm) pressing on the sensing region currently.

Preferably, the processor 16 generates a plurality of fingerprint data (such as fingerprint of thumb and fingerprint of index finger) according to the received triggering signal, and then encapsulates the plurality of the generated fingerprint data into a fingerprint composite data (such as the fingerprint composite data of thumb and index finger).

Preferably, the processor 16 may encapsulate the whole fingerprint data into the fingerprint composite data directly. Or, the processor 16 may first execute a feature analysis to the plurality of fingerprint data for generating a plurality of fingerprint features, and then encapsulates the plurality of the generated fingerprint features into the fingerprint composite data.

Step: S308: the processor 16 determines whether the holding data passes the fingerprint verification. Preferably, above-mentioned fingerprint verification is conducted by comparing the fingerprint composite data of the holding data with a preset fingerprint composite data of the owner of the handheld device 1, which is set in advance.

If the fingerprint composite data of the holding data is matched with the preset fingerprint composite data of any preset holding data, the processor 16 determines the holding data passes the fingerprint verification and the current user has been authorized, and executes step S310.

If the fingerprint composite data of the holding data is not matched with the preset fingerprint composite data of all the preset holding data, the processor 16 determines the holding data doesn't pass the fingerprint verification and the current user is unauthorized, and executes step S320.

Step: S310: the processor 16 controls the handheld device 1 to hide, delete or destroy the partial file(s) (such as operation log file or confidential file of another user). Preferably, above-mentioned file(s) corresponds to the matched preset holding data.

Preferably, the owner of the handheld device 1 may first input the plurality of the preset holding data respectively corresponding to the plurality of authorized users, and then operates the handheld device 1 to make the plurality of the preset holding data respectively corresponds to the different file(s) stored in the handheld device 1. Then, the handheld device 1 may hide, delete or destroy the corresponded file(s) automatically when identifying the authorized user is holding the handheld device 1. For example, the owner operates the handheld device 1 to make some files which the owner doesn't hope it to be searched or opened by the other users respectively correspond to the holding data corresponding to the user, so as to make the handheld device 1 may hide, delete or destroy the corresponded confidential file automatically when detecting the user holding.

Thus, the handheld device 1 may hide, delete or destroy the corresponded junk file or confidential file automatically when detecting the different user holding, so as to effectively release the storage capacity and prevent the confidential file form leak.

Step: S312: the processor 16 controls the handheld device 1 to enable the corresponded operating authority for making the handheld device 1 switch to the operating-authority-enabling status from the operating-authority-disabling status, wherein above-mentioned operating authority corresponds to the matched preset holding data.

Step: S314: the processor 16 determines whether the user stops holding the handheld device 1 according to the sensing of the fingerprint sensor. Preferably, the fingerprint sensor stops generating the triggering signal and stops sending the triggering signal to the processor 16 when the fingerprint sensor doesn't detect the user's finger or palm touch the sensing region of the fingerprint sensor.

Step: S316: the processor 16 determines whether the user stops holding the handheld device 1. More particularly, the processor 16 determines that the user currently does not hold the handheld device 1 and then executes the step S318 when the processor 16 does not receive the triggering signal from the fingerprint sensor. The processor 16 determines that the user currently holds the handheld device 1 and then re-executes the step S314 when the processor 16 still receives the triggering signal from the fingerprint sensor.

Step: S318: the processor 16 controls the handheld device 1 to disable the current operating authority for making the handheld device 1 switch to the operating-authority-disabling status from the operating-authority-enabling status.

If the processor 16 determines that the fingerprint composite data of the holding data is not matched with the preset fingerprint composite data in step S308, the processor 16 executes step S320: the processor 16 enables a stranger operating authority.

Preferably, above-mentioned stranger operating authority only allows the display screen to display the information related to the owner (such as the contact information of the owner of the handheld device 1) or only allows the handheld device 1 to communicate with a specific device.

For example, the stranger operating authority makes the handheld device 1 capture the current user for generating a photo shown the current user and sends the generated photo to a specific remote device via internet automatically. In another example, the stranger operating authority makes the handheld device 1 dial another device (such as the computer arranged at home) of the owner or communicate with another device of the owner automatically. Besides, under the stranger-operating-authority-enabling status, the handheld device 1 doesn't have ability of receiving any external operation.

The present invention may effectively prevent the confidential file stored in the handheld device 1 from leak via enabling the stranger operating authority automatically. In addition to that the prevent invention may effectively enhance a probability of the owner finding back the lost handheld device 1.

Figure 4:
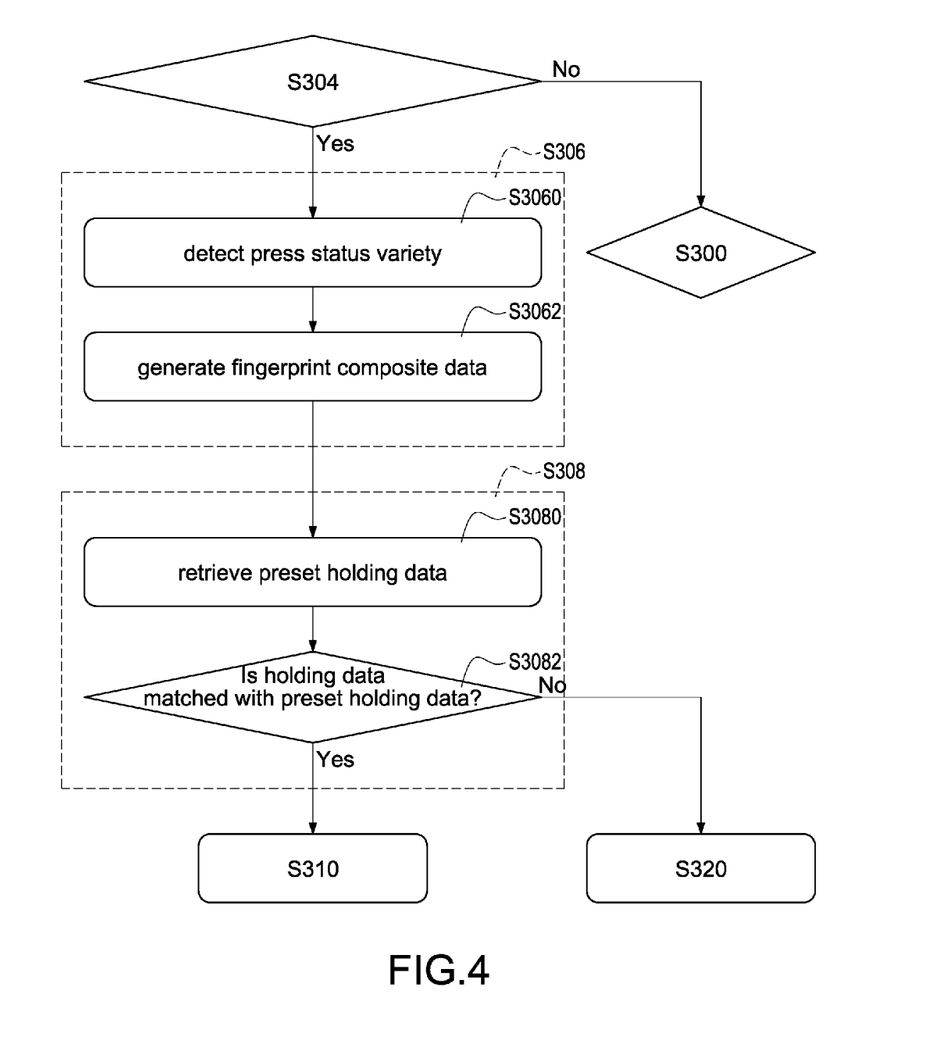
FIG. 4 shows a partial flowchart of a method of enabling and disabling operating authority for the handheld device according to a third embodiment of the present invention.

Please refer to FIG. 4, which shows a partial flowchart of a method of enabling and disabling operating authority for the handheld device according to a third embodiment of the present invention. Comparing to the second embodiment shown in FIG. 3, in the method of enabling and disabling operating authority for the handheld device 1 according to this embodiment, the step S306 comprises a step S3060 and a step S3062, the step S308 comprises a step S3080 and a step S3082, the details are as follows.

Step: S3060: the processor 16 continually detects a press status variety of the user's finger or palm presses on the sensing region of the fingerprint sensor via the fingerprint sensor. Preferably, the processor 16 detects above-mentioned press status variety and the palm print of the palm pressing on the fingerprint sensor or the fingerprint(s) of finger(s) pressing on the fingerprint sensor via the fingerprint sensor simultaneously.

Step: S3062: the processor 16 generates the fingerprint composite data of the holding data according to the palm print of the palm pressing on the sensing region of the fingerprint sensor or the fingerprint(s) of the finger(s) pressing on the sensing region of the fingerprint sensor.

Preferably, the processor 16 generates the fingerprint composite data of the holding data according to the palm print of the palm pressing on the sensing region of the fingerprint sensor or the fingerprint(s) of the finger(s) pressing on the sensing region of the fingerprint sensor and the continuous press status varieties.

For example, the handheld device 1 may detect the fingerprints of two fingers and generates the fingerprint composite data (two fingerprints) of the holding data when two fingers (such as the thumb and index finger) of the user press on the fingerprint sensor.

In another example, the handheld device 1 may orderly detect five fingerprints of five fingers, two fingerprints of two fingers and the press status variety and generate the ordered press status variety of the holding data (five fingerprints changing to two fingerprints) when the user first presses the fingerprint sensor by five fingers and changes to presses the fingerprint sensor by two fingers (such as the thumb and index finger).

Then, the processor 16 executes a step S3080: the processor 16 retrieving the plurality of the preset holding data.

Preferably, the plurality of the preset holding data is enabled by the owner of the handheld device 1 in advance, and corresponds to the different operating authorities respectively. Besides, each preset holding data comprises a preset fingerprint composite data respectively.

Step: S3082: the processor 16 determines whether the fingerprint composite data of the holding data is matched with a preset fingerprint composite data of any preset holding data enabled in advance.

The processor 16 determines the holding data passes the fingerprint verification and executes the step S310 if the processor 16 determines the fingerprint composite data of the holding data is matched with the present fingerprint composite data of one preset holding data. Otherwise, the processor 16 determines the holding data fails to pass the fingerprint verification and executes the step S320.

Figure 5:
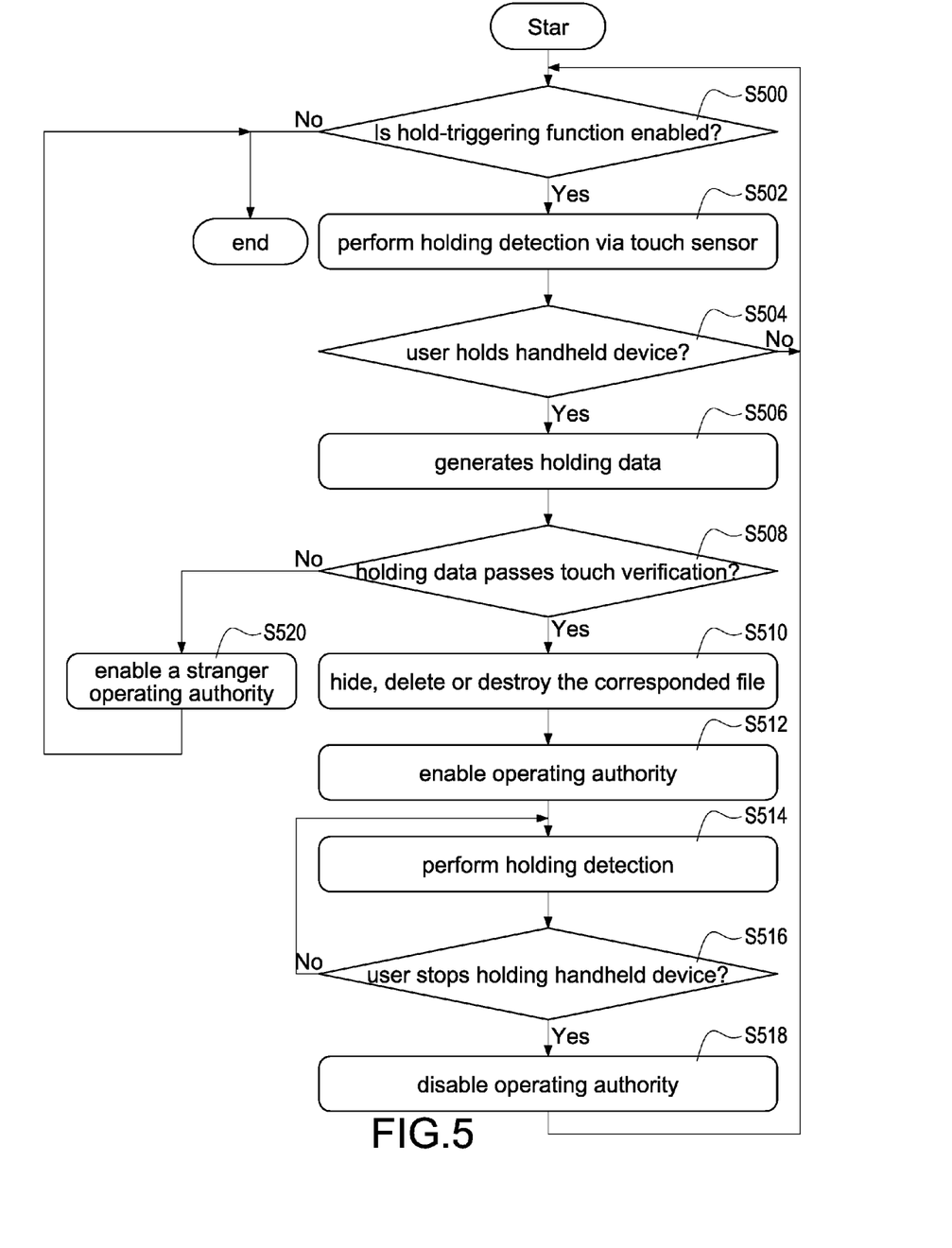
FIG. 5 shows a flowchart of a method of enabling and disabling operating authority for the handheld device according to a fourth embodiment of the present invention.

Please refer to FIG. 5, which shows a flowchart of a method of enabling and disabling operating authority for the handheld device according to a fourth embodiment of the present invention. In this embodiment, the handheld device 14 may comprise one or more sensing unit 14, and at least one sensing unit 14 is touch sensor.

Preferably, above-mentioned touch sensor is a force sensor. Additionally, a sensing region of at least one above-mentioned touch sensor has an area larger than 2.25 square centimeters and a side length larger than 1.5 centimeters, but this specific example is not intended to limit the scope of the present invention.

The method of enabling and disabling operating authority for the handheld device according to the present invention has following steps to realize hold-triggering function by touch identification.

Step: S500: the processor 16 determines whether the hold-triggering function is enabled. The processor 16 executes step S502 if the hold-triggering function is enabled; otherwise the operating method for the handheld device 1 is ended.

Step: S502: the processor 16 determines whether the user currently holds the handheld device 1 according to the sensing of the touch sensor. More particularly, the touch sensor generates triggering signal and sends the triggering signal to the processor 16 when the touch sensor senses the touch of the user's finger (or palm) on the sensing region thereof.

Step: S504: the processor 16 determines whether the user currently holds the handheld device 1. More particularly, the processor 16 determines that the user currently holds the handheld device 1 and then executes the step S506 when the processor 16 receives the triggering signal from the touch sensor. The processor 16 determines that the user currently does not hold the handheld device 1 and then re-executes the step S500 when the processor 16 does not receive the triggering signal from the touch sensor.

Step: S506: the processor 16 generates a holding data corresponding to the user's holding action according to the triggering signal received from each touch sensor.

Preferably, the holding data comprises a touch composite data and the touch composite data is corresponded to a touch status (such as the number, the positions and the order of the touching points) of the user's hand pressing on the sensing region of the touch sensor currently.

Preferably, the holding data comprises a force composite data and the force composite data is corresponded to a force status of the user's hand pressing on the sensing region of the touch sensor currently.

Preferably, the processor 16 generates a plurality of touch data (such as determining that three fingers touch the first touch sensor according to the received triggering signal from the first touch sensor, and determining that one finger touch the second touch sensor according to the received triggering signal from the second touch sensor) according to the received triggering signal, and then encapsulates the plurality of the generated touch data into a touch composite data (such as four fingers touching).

In another embodiment, the processor 16 simultaneously generates a plurality of touch data and force data (such as determining that force of three points are 30 grams, 80 grams and 50 grams respectively according to the received triggering signal from the first touch sensor, and determining that the force of one point is 60 grams according to the received triggering signal from the second touch sensor) according to the received triggering signal, and then encapsulates the plurality of the generated touch data into a touch composite data, and encapsulates the plurality of the generated force data into a force composite data (such as force of four points are respectively 30 grams, 80 grams, 50 grams and 60 grams).

Preferably, the processor 16 may encapsulate the whole touch data into the touch composite data and encapsulate the whole force data into the force composite data directly. Or, the processor 16 may first execute a feature analysis to the plurality of touch data and the plurality of force data for generating a plurality of simplified touch features (such as connecting all touch points to a line) and a plurality of simplified force features (such as the order of the force of all touch points), and then encapsulates the plurality of the generated touch features into the touch composite data and encapsulates the plurality of the generated force features into the force composite data. Finally, the processor 16 combines the touch composite data with the force composite data as the holding data.

Step: S508: the processor 16 determines whether the holding data passes the touch verification. Preferably, above-mentioned touch verification is conducted by comparing the touch composite data of the holding data with a preset touch composite data of the preset holding data of the owner of the handheld device 1, which is set in advance. Preferably, above-mentioned touch verification is conducted by comparing the force composite data of the holding data with a preset force composite data of the same preset holding data of the owner of the handheld device 1, which is set in advance.

If the touch composite data of the holding data is matched with the preset touch composite data of any preset holding data and/or the force composite data of the holding data is matched with the preset force composite data of the same preset holding data, the processor 16 determines the holding data passes the touch verification and the current user has been authorized, and executes step S510.

If the touch composite data of the holding data is not matched with the preset touch composite data of any preset holding data or the force composite data of the holding data is not matched with the preset force composite data of the same preset holding data, the processor 16 determines the holding data doesn't pass the touch verification and the current user is unauthorized, and executes step S520.

Step: S510: the processor 16 controls the handheld device 1 to hide, delete or destroy the partial file(s) (such as the confidential file of the owner). Preferably, above-mentioned file(s) corresponds to the matched preset holding data. For example, the user may destroy the configured confidential file by executing the holding action of five fingers clenching, releasing and clenching orderly.

Step: S512: the processor 16 controls the handheld device 1 to enable the corresponded operating authority for making the handheld device 1 switch to the operating-authority-enabling status from the operating-authority-disabling status, wherein above-mentioned operating authority corresponds to the matched preset holding data.

Step: S514: the processor 16 determines whether the user stops holding the handheld device 1 according to the sensing of the touch sensor. Preferably, the touch sensor stops generating the triggering signal and stops sending the triggering signal to the processor 16 when the touch sensor doesn't detect the user's finger or palm touch the sensing region of the touch sensor.

Step: S516: the processor 16 determines whether the user stops holding the handheld device 1. More particularly, the processor 16 determines that the user currently does not hold the handheld device 1 and then executes the step S518 when the processor 16 does not receive the triggering signal from the touch sensor. The processor 16 determines that the user currently holds the handheld device 1 and then re-executes the step S514 when the processor 16 still receives the triggering signal from the touch sensor.

Step: S518: the processor 16 controls the handheld device 1 to disable the current operating authority for making the handheld device 1 switch to the operating-authority-disabling status from the operating-authority-enabling status.

If the processor 16 determines that the holding data is not matched with the preset holding data in step S508, the processor 16 executes step S520: the processor 16 enables a stranger operating authority.

Figure 6:
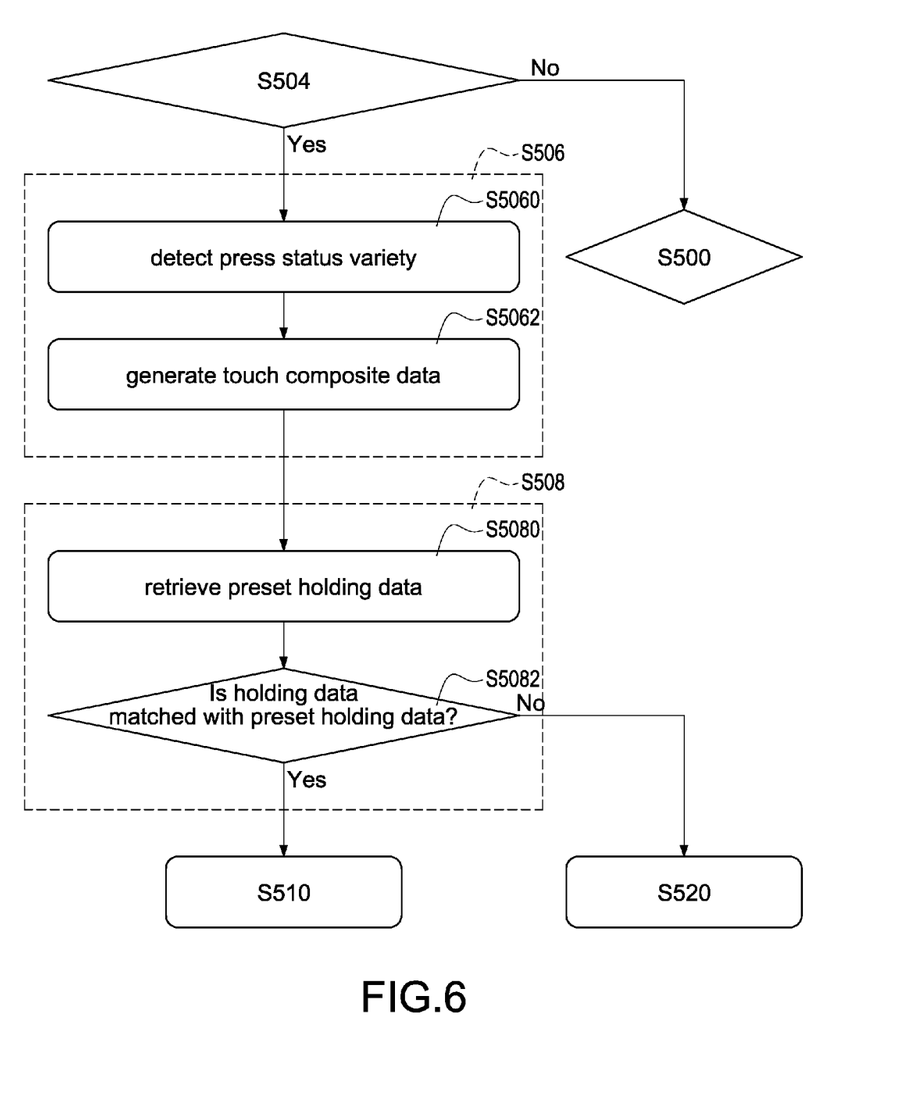
FIG. 6 shows a partial flowchart of a method of enabling and disabling operating authority for the handheld device according to a fifth embodiment of the present invention.

Please refer to FIG. 6 shows a partial flowchart of a method of enabling and disabling operating authority for the handheld device according to a fifth embodiment of the present invention. Comparing to the fourth embodiment shown in FIG. 5, in the method of enabling and disabling operating authority for the handheld device 1 according to this embodiment, the step S506 comprises a step S5060 and a step S5062, the step S508 comprises a step S5080 and a step S5082, the details are as follows.

Step: S5060: the processor 16 continually detects a press status variety of the user's finger or palm presses on the sensing region of the touch sensor via the touch sensor.

Preferably, the processor 16 detects above-mentioned press status variety and/or a force status variety of the palm pressing on the touch sensor or the finger(s) pressing on the touch sensor via the touch sensor simultaneously.

Step: S5062: the processor 16 generates the touch composite data of the holding data according to the press status variety and/or generates the force composite data of the holding data according to the force status variety.

For example, the handheld device 1 may detect two touch points of two fingers and generates touch composite data (two touch points) of the holding data when two fingers (such as the thumb and index finger) of the user press on the touch sensor.

In another example, the handheld device 1 may orderly detect five touch points of five fingers, two touch points of two fingers and generate the ordered press status variety of the holding data (five touch points changing to two touch points) when the user first presses the touch sensor of the handheld device 1 by five fingers and changes to presses the touch sensor by two fingers.

In another example, the handheld device 1 may orderly detect three touch points of three fingers (the force of three points are 50 grams, 30 grams and 80 grams respectively), two touch points of two fingers (the force of two points are 50 grams and 80 grams respectively) and generate the ordered press status variety of the holding data (three touch points changing to two touch points) and generate the ordered force status variety of the holding data (a combination of 50 grams, 30 grams and 80 grams changing to a combination of 50 grams and 80 grams) when the user first presses the touch sensor of the handheld device 1 using the different force respectively by three fingers and changes to presses the touch sensor by two fingers.

Then, the processor 16 executes a step S5080: the processor 16 retrieving the plurality of the preset holding data.

Preferably, the plurality of the preset holding data is enabled by the owner of the handheld device 1 in advance, and corresponds to the different operating authorities respectively. Besides, each preset holding data comprises a preset touch composite data and/or a force composite data respectively.

Step: S5082: the processor 16 determines whether the touch composite data of the holding data is matched with a preset touch composite data of any preset holding data enabled in advance and/or determines whether the force composite data of the holding data is matched with a preset force composite data of the same preset holding data.

The processor 16 determines the holding data passes the touch verification and executes the step S510 if the processor 16 determines the touch composite data of the holding data is matched with the present touch composite data of one preset holding data and the force composite data of the holding data is matched with the present force composite data of the same preset holding data. Otherwise, the processor 16 determines the holding data fails to pass the touch verification and executes the step S520.

Please refer to FIG. 7 and FIG. 8, FIG. 7 is a schematic view of enabling a first operating authority according to the present invention, FIG. 8 is a schematic view of enabling a second operating authority according to the present invention. Those figures exemplify an operation of the handheld device 1 according to the present invention.

As shown in FIGS. 7 and 8, in this embodiment the handheld device 1 comprises two sensing units 140, 142. The sensing unit 140 is arranged on an upper-left side of the handheld device 1 when viewing toward the display screen to sense the left thumb of user; the sensing unit 142 is arranged on a right side of the handheld device 1 when viewing toward the display screen to sense the other four fingers of user's left hand.

In this embodiment the method of enabling and disabling operating authority of handheld device 1 of the present invention further provides a gesture-triggering function. More particularly, the gesture-triggering function may automatically switch the handheld device 1 to enable/disable the operating authority according to the different gestures of the user holding the handheld device 1 currently.

The following description exemplifies the sensing units 140, 142 as fingerprint sensors. The current user is the owner of the handheld device 1. When the handheld device 1 is in operating-authority-disabling status and the five fingers of user hand closely touch the sensing units 140,142 of the handheld device 1 as shown in FIG. 7. Then, the handheld device 1 identifies the current user is the owner according to the fingerprints of the five fingers, and automatically enables the operating authority of the owner (first operating authority).

More specifically, when the handheld device 1 enables the first operating authority (such as the administrator authority), all the files (such as the files 70-80 shown in FIG. 7) stored in the handheld device 1 and all the application program (such as the application program 82-86 shown in FIG. 7) may be may be displayable, and the handheld device 1 is configured to allow to receive any operation for the files 70-80 and the application program 82-86 by the owner.

If the current user is an authorized user but not the owner, when the handheld device 1 is in operating-authority-disabling status and the two fingers of the user's hand closely touch the sensing units 140, 142 of the handheld device 1 as shown in FIG. 8. Then, the handheld device 1 identifies the current user is the authorized user according to the fingerprints of the two fingers, and automatically enables the operating authority of the user (second operating authority).

More specifically, when the handheld device 1 enables the second operating authority, the handheld device 1 can display, hide or delete partial files stored in the handheld device 1, or configure the partial files to read only, such as displaying the files 74-78, hiding the files 70, 72, deleting the files 80 and configuring the file 74, 76 to read only.

Additionally, the handheld device 1 allows the user to use partial application program according to the second operating authority, and hides or disables partial application program, such as allowing executing application program 86, hiding application program 82 and disabling application program 84.

Moreover, the fingerprint sensor can identify different fingers of the same user. The gesture-triggering function can be set by user to execute following procedures: automatically enabling a third operating authority (such as configuring all the files 70-80 to read only) when detecting user's thumb and middle finger closely touching the handheld device 1; automatically enabling a fourth operating authority (such as hiding all the files 70-80) when detecting user's thumb and ring finger closely touching the handheld device 1; automatically enabling a fifth operating authority (such as allowing to execute all the application program 82-86) when detecting user's thumb and little finger closely touching the handheld device 1.

The following description exemplifies the sensing units 140, 142 as force sensors. The current user is the owner of the handheld device 1. When the handheld device 1 is in operating-authority-disabling status and the five fingers of user hand closely touch the sensing units 140, 142 of the handheld device 1 as shown in FIG. 7. Then, the handheld device 1 identifies the current user is the owner according to the fingerprints of the five fingers, and automatically enables the operating authority of the owner (first operating authority).

If the current user is an authorized user but not the owner, when the handheld device 1 is in operating-authority-disabling status and the two fingers of the user's hand closely touch the sensing units 140, 142 of the handheld device 1 as shown in FIG. 8. Then, the handheld device 1 identifies the current user is the authorized user according to the fingerprints of the two fingers, and automatically enables the operating authority of the user (second operating authority).

Moreover, the force sensor can identify different exerting force of the same finger. The gesture-triggering function can be set by user to execute following procedures: automatically enabling a third operating authority when detecting user's two fingers lightly pressing the handheld device 1; automatically enabling a fourth operating authority when detecting user's two fingers heavily pressing the handheld device 1; automatically enabling a fifth operating authority when detecting user's five fingers lightly pressing the handheld device 1 at the same time and so forth.

Therefore, the present invention can effectively simplify the switch operation of enabling and disabling the operating authority, and the user experience can be better via the gesture-triggering function.

Please be noted that above specific example is not intended to limit that the type of all the sensing units 14 of the present invention is one of the fingerprint sensor, the touch sensor or the force sensor. In another embodiment, the partial sensing units 14 are fingerprint sensors used to detect the fingerprint (and/or palm print), the partial sensing units 14 are touch sensors used to detect touch, and the partial sensing units 14 are force sensors used to detect force. In another embodiment, a part of sensing units 14 are fingerprint sensors, another part of sensing units 14 are touch sensors.

The above mentioned are only preferred specific examples in the present invention, and are not thence restrictive to the scope of claims of the present invention. Therefore, those who apply equivalent changes incorporating contents from the present invention are included in the scope of this application, as stated herein.

What is claimed is:

1. A method of enabling and disabling operating authority of a handheld device, comprising:
   a) detecting a holding action of a user via at least one fingerprint sensor of the handheld device;
   b) generating holding data when detecting the holding action of the user, wherein the holding data comprises fingerprint composite data, the fingerprint composite data corresponds to at least one fingerprint of at least one finger pressing on the at least one fingerprint sensor or a palm print of a palm of the user pressing on the at least one fingerprint sensor;
   c) retrieving a plurality of preset holding data, wherein the plurality of preset holding data respectively correspond to a plurality of operating authorities, wherein the plurality of preset holding data respectively correspond to a plurality of different combinations of files stored in the handheld device, the plurality of operating authorities are configured to enable the combination of files corresponding to the same preset holding data to be searched, read, edited, converted or accessed, and one of the plurality of operating authorities is read only operating authority;
   d) performing a fingerprint verification on the fingerprint composite data of the holding data;
   e) determining that the fingerprint composite data passes the fingerprint verification when the fingerprint composite data is matched with preset fingerprint composite data of one of the plurality of preset holding data, and controlling the handheld device to enable the corresponding operating authority for enable the combination of files corresponding to the matched preset holding data to be searched, read, edited, converted or accessed, wherein all the files stored in the handheld device are configured to be read only if the operating authority being enabled is the read only operating authority;
   f) determining that the fingerprint composite data fails to pass the fingerprint verification when the holding data is not matched with all of the preset holding data, and controlling the handheld device to enable a stranger operating authority, wherein the stranger operating authority is configured to allow a display screen of the handheld device to display only the information related to an owner of the handheld device or allow the handheld device to communicate only with a specific device;
   g) continually or intermittently detecting the holding action of the user via the at least one fingerprint sensor; and
   h) controlling the handheld device to disable the operating authority when the holding action is not detected.

2. The method of enabling and disabling operating authority of the handheld device according to claim 1, wherein the step a) is performed to determine that the holding action is detected when the at least one fingerprint sensor is pressed by the multiple fingers of the user.

3. The method of enabling and disabling operating authority of the handheld device according to claim 1, wherein a sensing region of the at least one fingerprint sensor has an area larger than 2.25 square centimeters and a side length larger than 1.5 centimeters; the step a) is performed to determine that the holding action is detected when the at least one fingerprint sensor is pressed by the palm or the at least one finger of the user.

4. The method of enabling and disabling operating authority of the handheld device according to claim 1, wherein the step b) comprises following steps of:
   b1) continually detecting a press status variety of the at least one finger or the palm of the user presses on a sensing region of the at least one fingerprint sensor; and
   b2) generating the fingerprint composite data of the holding data according to the palm print of the palm or the at least one fingerprint of the at least one finger of the user and the continuous press status varieties.

5. The method of enabling and disabling operating authority of the handheld device according to claim 4, wherein the plurality of preset holding data further respectively correspond to a plurality of different combinations of junk files or confidential files stored in the handheld device; the step e) comprises a step e1) controlling the handheld device to hide, delete or destroy the combinations of junk files or confidential files corresponding to the matched preset holding data when the fingerprint composite data is matched with the preset fingerprint composite data of any preset holding data.

6. The method of enabling and disabling operating authority of the handheld device according to claim 1, wherein the at least one fingerprint sensor is arranged outside a display region of the display screen of the handheld device.

7. A method of enabling and disabling operating authority of a handheld device, comprising:
   a) detecting a holding action of a user via at least one touch sensor of the handheld device;
   b) generating holding data when detecting the holding action of the user, wherein the holding data comprises touch composite data, the touch composite data corresponds to a touch status of at least one finger or a palm of the user pressing on the at least one touch sensor;
   c) retrieving a plurality of preset holding data, wherein the plurality of preset holding data respectively correspond to a plurality of operating authorities, the plurality of preset holding data respectively correspond to a plurality of different combinations of files stored in the handheld device, the plurality of operating authorities are configured to enable the combination of files corresponding to the same preset holding data to be searched, read, edited, converted or accessed, one of the plurality of operating authorities is read only operating authority;
   d) performing a touch verification on the touch composite data of the holding data;
   e) determining that the holding data passes the touch verification when the touch composite data is matched with preset touch composite data of one of the plurality of preset holding data, and controlling the handheld device to enable the corresponding operating authority for enable the combination of files corresponding to the matched preset holding data to be searched, read, edited, converted or accessed, wherein all the files stored in the handheld device are configured to be read only if the operating authority being enabled is the read only operating authority;

f) determining that the holding data fails to pass the touch verification when the holding data is not matched with all of the preset holding data, and controlling the handheld device to enable a stranger operating authority, wherein the stranger operating authority is configured to allow a display screen of the handheld device to display only the information related to an owner of the handheld device or allow the handheld device to communicate only with a specific device;

g) continually or intermittently detecting whether the user stops holding the handheld device via the at least one touch sensor; and h) controlling the handheld device to disable the operating authority when the holding action is not detected.

8. The method of enabling and disabling operating authority of the handheld device according to claim 7, wherein the step a) is performed to determine the holding action is detected when the at least one touch sensor is pressed by the multiple fingers of the user; the step c) is performed to determine that the touch composite data passes the touch verification when the touch composite data is matched with preset touch composite data of preset holding data.

9. The method of enabling and disabling operating authority of the handheld device according to claim 7, wherein the step b) comprises following steps of:

b1) continually detecting a press status variety of the at least one finger or the palm of the user presses on the at least one touch sensor; and b2) generating the touch composite data of the holding data according to the continuous press status varieties.

10. The method of enabling and disabling operating authority of the handheld device according to claim 7, wherein the at least one touch sensor is a force sensor; the step a) is performed to detect the holding action when the at least one touch sensor is pressed by the multiple fingers of the user; the step b) is performed to generate the touch composite data and force composite data of the holding data, wherein the force composite data corresponds to a force status of the multiple fingers pressing on the at least one touch sensor; the step e) is performed to determining the holding data passes the touch verification when the touch composite data is matched with preset touch composite data of preset holding data and the force composite data is matched with preset force composite data of the same preset holding data.

11. The method of enabling and disabling operating authority of the handheld device according to claim 7, wherein the at least one touch sensor is a force sensor; the step b) comprises following steps of:

b3) continually detecting a press status variety of the at least one finger or the palm of the user pressing on the at least one touch sensor and a force status variety of the at least one finger or the palm of the user pressing on the at least one touch sensor; and b4) generating the touch composite data of the holding data according to the continuous press status varieties and generating force composite data of the holding data according to the continuous force status varieties;

wherein the step e) is performed to determine that the holding data passes the touch verification when the touch composite data is matched with the preset touch composite data of any preset holding data and the force composite data is matched with preset force composite data of the same preset holding data.

12. The method of enabling and disabling operating authority of the handheld device according to claim 11, wherein the plurality of preset holding data respectively correspond to a plurality of different combinations of junk files or confidential files stored in the handheld device; the step e) comprises a step e1) controlling the handheld device to hide, delete or destroy the combinations of junk files or confidential files corresponding to the matched preset holding data when the touch composite data is matched with the preset touch composite data of any preset holding data.

13. The method of enabling and disabling operating authority of the handheld device according to claim 7, wherein the at least one touch sensor is arranged outside a display region of a display screen of the handheld device.

\* \* \* \* \*